United States Patent [19]

Sutoh et al.

[11] Patent Number: 4,519,443
[45] Date of Patent: May 28, 1985

[54] WINDOW PANE DEFROSTER DEVICE WITH VEHICLE AIR CONDITIONING APPARATUS

[75] Inventors: Shinji Sutoh, Gunma; Toshizo Hara; Akiyoshi Takahashi, both of Saitama, all of Japan

[73] Assignee: Diesel Kiki Kabushiki Kaisha, Tokyo, Japan

[21] Appl. No.: 312,619

[22] Filed: Oct. 19, 1981

[30] Foreign Application Priority Data

Oct. 31, 1980 [JP] Japan ................. 55-152059

[51] Int. Cl.$^3$ .............................. B60S 1/54
[52] U.S. Cl. ................... 165/17; 62/176.5; 165/16; 165/43; 98/2.08; 98/2.09
[58] Field of Search ............. 165/17, 42, 43; 98/2.04, 2.08, 2.09, 2.1; 62/176.5, 275

[56] References Cited

U.S. PATENT DOCUMENTS

| | | | |
|---|---|---|---|
| 4,004,126 | 1/1977 | Boaz | 98/2.08 |
| 4,183,397 | 1/1980 | d'Orsay et al. | 165/43 |
| 4,261,179 | 4/1981 | Dageford | 62/275 |
| 4,324,286 | 4/1982 | Brett | 62/176.5 |

FOREIGN PATENT DOCUMENTS

| | | | |
|---|---|---|---|
| 0197806 | 8/1978 | Fed. Rep. of Germany | 98/2.08 |
| 18142 | 2/1978 | Japan | 98/2.09 |
| 108320 | 8/1979 | Japan | 98/2.09 |
| 1255611 | 12/1971 | United Kingdom | 98/2.08 |

Primary Examiner—Albert W. Davis, Jr.
Attorney, Agent, or Firm—McAulay, Fields, Fisher, Goldstein & Nissen

[57] ABSTRACT

This invention relates to a vehicle air conditioning device and defroster having a control circuit for controlling a compressor, an outdoor air/inner air change-over door and a blower fan for air conditioning the vehicle room. A control switch is provided for a rear window heater wire for defrosting the window pane of the vehicle containing the wire. The vehicle air conditioner is operated in response to the operation of the rear window heater when it is energized. The rear window heater wire is turned on manually or automatically in response to an outdoor frost sensor. The compressor is operated to defrost when the outdoor air temperature is higher than the allowable operating temperature in the compressor. During operation of the control switch, the outdoor air/inner air change-over door is controlled, when the air temperature is lower than a selected allowable operating temperature, so as to increase the feeding rate of the outdoor air or to increase the feeding volume of the outdoor air. When the rear window heater wire is set to a turned on-mode by the rear window heater wire control switch, a defrosting operation it is performed simultaneously with reference to the operation of the compressor or outdoor air/inner air change-over door or blower fan, so that it is possible to prevent frosting either at a front glass or side window panes, to defrost the window panes and to economize on power consumption by the heater wire.

14 Claims, 2 Drawing Figures

WINDOW PANE DEFROSTER DEVICE WITH VEHICLE AIR CONDITIONING APPARATUS

BACKGROUND OF THE INVENTION

When a car is operated with the interior thereof warmer than the exterior, the inner surfaces of the window panes become fogged. In some instances when the outside air is very cold, frost accumulates on the outside of the window panes. In order to defrost, the driver turns on the compressor manually, adjusts the ventilation volume of outdoor air by adjusting the blower fan, sets a defrost mode by adjusting a mode setting lever. Such an operation distracts the driver and interferes with driving. In addition to this operation, a rear heater wire printed on the rear window pane is energized in order to defrost and this feature consumes more current.

SUMMARY OF THE INVENTION

It is an object of the present invention to provide an effective defrosting operation and to give an indication to the driver by sensing if a rear window heater in a vehicle window pane is energized or not and by operating the vehicle air conditioning device in response to the operation of the rear window heater when it is energized.

It is another object of the present invention to provide an effective defrosting operation when ventilating with outdoor air by operating a vehicle air conditioning compressor when the ambient air temperature is higher than a predetermined allowable operating temperature and the feeding rate and the feeding volume of the surrounding air are increased when the outdoor air temperature is lower than a predetermined operating temperature.

It is yet further object of the present invention to reduce the duration of energization of the rear window heater as well as to save energy by defrosting under the operation of a vehicle air conditioning device.

BRIEF DESCRIPTION OF THE DRAWINGS

Other objects, features and advantages of the present invention will be apparent from the following detailed description of the invention in reference to the accompanying drawings.

In FIG. 1, an evaporator 1 is arranged at the upstream portion of the device, a heater core 2 is arranged at the downstream portion of the device. The evaporator 1 operates to cool the incoming air. The cooling system is completed by the evaporator 1, compressor 3, condenser 6, liquid receiver tank 7 and expansion valve 8. Operation of this system is performed by turning on or off a solenoid clutch 4 for the compressor 3. Control operation for the driving of compressor is performed in reference to the output from the control circuit 5.

Figure 1:
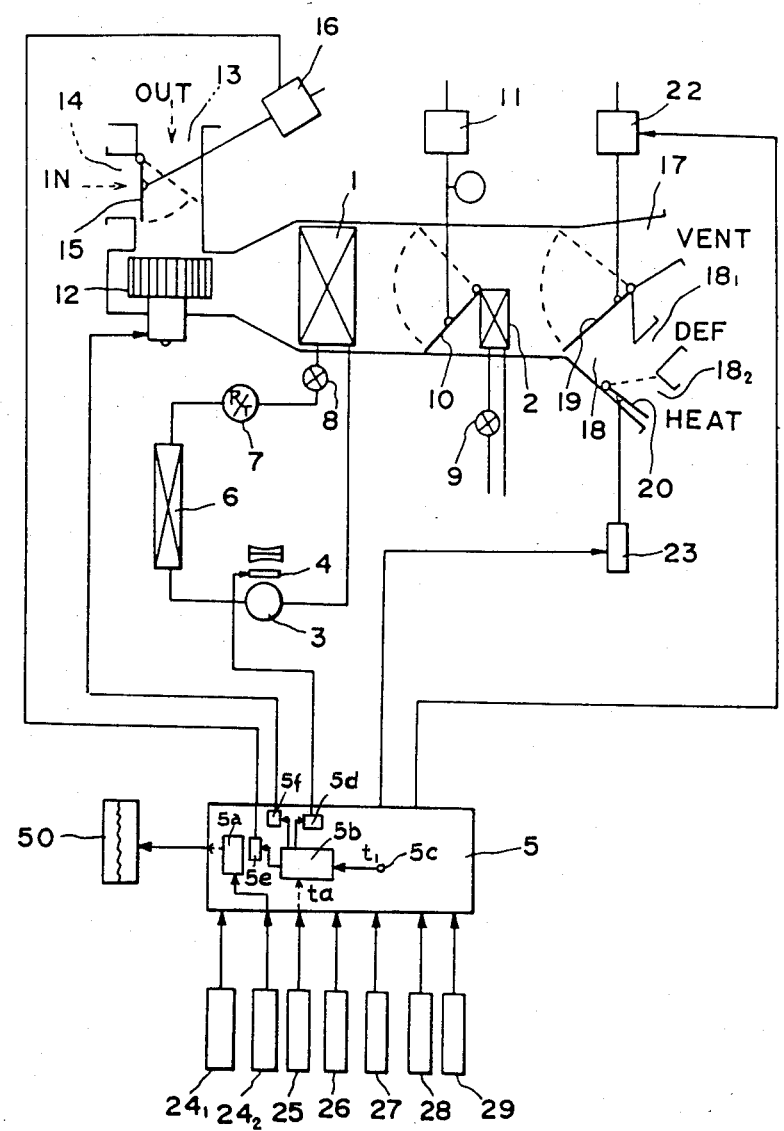
FIG. 1 is a block diagram showing one preferred embodiment of a defroster device for a window pane which is applied with a vehicle air conditioning device constructed in accordance with the present invention.
Figure 2:
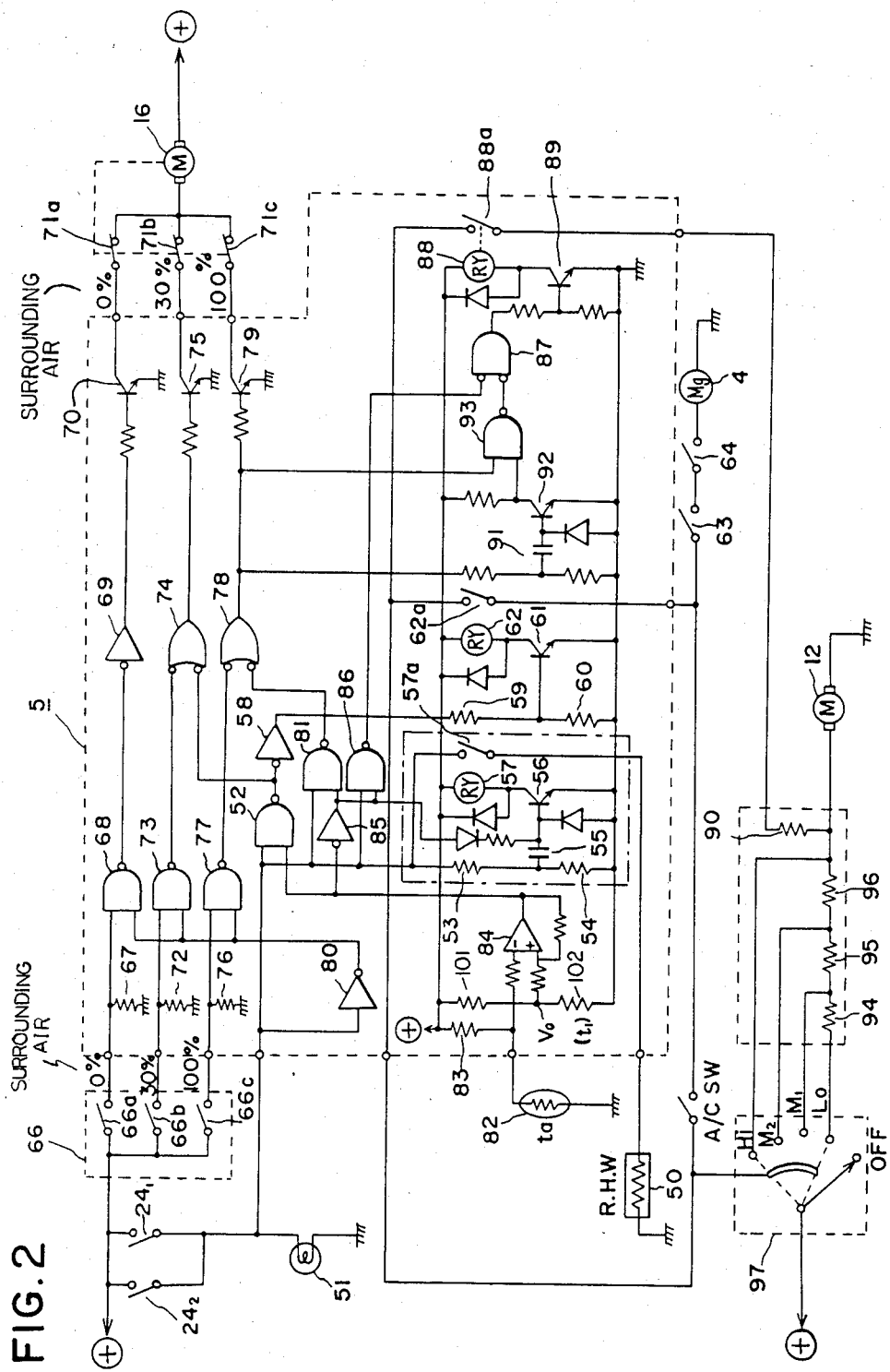
FIG. 2 is an electric circuit diagram for the defroster device for a window pane of a vehicle air conditioning device constructed in accordance with the present invention.

The heater core 2 operates to heat the incoming air, the water cock 9 is opened or closed in response to the output from the control circuit 5 so as to control the flow of engine coolant, and an air feeding is controlled by a control actuator 11 for the air mixing door 10. That is, the air mixing door 10 is arranged at the upstream of the heater core 2 so as to vary a mixture ratio between the cold air and the hot air in reference to the opening of air mixing door 10 and thereby a temperature of the air is properly controlled. Blower fan 12 selectively sucks in outdoor air or interior air from the outer air port 13 or interior air port 14 in response to a position of the surrounding air/interior air change-over door 15 and then feeds the air into the evaporator 1. The blower fan 12 is controlled in sequence for a speed of rotation ranging from zero to a maximum speed in response to the output from the control circuit 5. The surrounding air/interior air change-over door 15 is controlled by the actuator 16 in response to the output from the control circuit 5. The most downstream portion of the device is divided into the upper blow port 17 and the blow port 18. The blow port 18 is further divided into a defrost blow port $18_1$ and the lower blow port $18_2$. At the divided part between the upper blow port 17 and the blow port 18 is arranged a mode change-over door 19. At the blow port 18 is installed another mode change-over door 20, the door 19 is controlled by the output from the control circuit 5 through the actuator 22, and the door 20 is similarly controlled by the output from the control circuit 5 through the actuator 23.

That is, under the cooling mode of operation, the blow port 18 is closed by door 19, resulting in opening of blow port 17 and in turn under a heating mode of operation the blow port 17 is closed by the door 19. Under a bi-level mode, the door 19 is set at its neutral position, the door 20 is opened and in turn under a defrost mode of operation, the blow port 17 is closed by the door 19, and the position of the door 20 is changed in such a way as the air is fed to the defrost blow port 18.

The above-mentioned vehicle air conditioning device is controlled by the output from the control circuit 5 in such a way as the control circuit 5 performs its control operation by sensing the signals obtained from the outdoor air temperature sensor 25 and the mode setters 26, 27, 28 and 29. The mode setter 26 transmits a cooling mode setting signal, the mode setter 27 transmits a bi-level mode setting signal, the mode setter 28 transmits a heater mode setting signal and the mode setter 29 transmits a defrost mode setting signal, respectively. The control circuit 5 is further provided with a rear window heater, control switch 24, said switch 24 being connected with a manual demist switch $24_1$, and a rear window heater line control switch $24_2$ which is turned on in response to the output from a dew sensor for sensing a dew produced on the vehicle window pane, and thereby the rear heater line 50 is controlled.

Operation of the device shown in FIG. 1 will now be described. At first, when a frost is produced at the vehicle window pane, the demist switch $24_1$, is turned on or the rear heater line control switch $24_2$ is turned on, resulting in that the rear window heater 50 is set to a turned-on mode. The control circuit 5 is responsive to a signal from air temperature sensor 25 to sense the surrounding outside air temperature $t_a$. The control circuit 5 is preliminarily set with a working tolerance temperature or allowable operating temperature $t_1$ to control the operation of the compressor 3 so that it is trouble free. For example, if the working temperature $t_1$ is set at 5° C., then when the outside air temperature is 5° C. or higher, the temperature $t_1$ set in the control circuit 5, the compressor 3 is driven. Specifically, when the outside air temperature is 5° C. or higher, the solenoid clutch 4 is actuated and the compressor 3 is operated. Since the air fed by the blower fan 12 is defrosted by evaporator 1, air having a low absolute humidity is fed into the vehicle, thus decreasing the absolute humidity in the vehicle thereby defrosting the window pane. Since the compressor is not operated at a temperature lower than the operating temperature $t_1$, the evaporator may freeze without damaging the compressor.

In turn, if the outdoor air temperature $t_a$ is lower than said working tolerance temperature $t_1$, the control circuit 5 controls the actuator 16 to operate the outdoor air/interior air change-over door 15. A large amount of outdoor air having a low absolute humidity is fed into the device. The feeding rate of outdoor air being 100%, the absolute humidity in the vehicle room is decreased and the window pane is defrosted. With the change-over door 15 turned to the position to close the interior air port 14, outdoor air is introduced 100%. Then, t seconds afterwards the rpm of the blower fan 12 is increased to the next higher speed. For example, if the blower fan 12 has been operating at the middle speed, it is changed to the high speed. With the increase of the blower fan 12, the rate of supply of outdoor air is increased. The control circuit 5 is operated according to the output signal of either one of the switches $24_1$ and $24_2$. A check is done as to whether the outdoor air temperature $t_a$ is higher than the allowable operating temperature $t_1$ set in the control circuit, and when temperature $t_a$ is lower than temperature $t_1$, either the feeding rate of air or both the feeding rate of air and a feeding volume of air is increased. The volume of air fed from the defrost blow outlet is increased. Thereby, the frost at the inner surface of the glass of the vehicle is removed and safe driving of the vehicle may be continued. Since defrosting is rapid, the time of energization in the rear window heater wire 50 may be reduced and an energy consumption reduced.

When the compressor is turned on, it is better to effect a quick moisture removal and clear a blur in the interior of the vehicle by feeding the interior air, for instance with the feeding rate of the interior air set at 70%, to the evaporator rather than dehumidifying the the outdoor air through the evaporator to the interior of the vehicle by setting a feeding rate of outdoor air at 100%. Doing so dehumidifies the air in the interior of the vehicle more quickly. In this case, when the outdoor air is introduced at 30%, the interior of the vehicle is prevented from being contaminated.

In the defrosting mode of the compressor, the rear window heater 50 is automatically turned off if a time of t (sec) passes after the rear window heater wire 50 is turned on. This renders necessary that the driver turn off the rear window heater 50 and economizes power.

The electric circuit diagram for a vehicle air conditioning device of the present invention includes the above-mentioned demist switch $24_1$ and, $24_2$ is the rear window heater wire switch. One end of the line extending from the rear heater wire is connected to the operation display lamp 51, its connecting point with the lamp 51 is connected to one of the input terminals of NAND circuit 52, the connecting point is further connected to a resistor 54 through resistor 53. A connecting point between the resistors 53 and 54 is connected to a base of the transistor 56 through capacitor 55, the transistor 56 is connected to a relay 57 which turns on or off the contact point 57a, the contact point 57a being connected to a power supply circuit for the rear window heater wire 50. The output from said NAND circuit 52 is connected to the resistors 59, 60 via inverter circuit 58. A connecting point between the resistors 59 and 60 is connected to a base of the transistor 61. The transistor 61 is connected to a relay 62 which controls the contact point 62a, which is connected to a solenoid clutch 4 through a defrost switch 63 for use in preventing freezing of the evaporator and through an outdoor air safety switch 64 for use in turning off the compressor when the outdoor air temperature is low.

66 indicates a door control unit which consisting of three opening degree setting switches 66a, 66b and 66c for the outdoor air/interior air change-over door 15. The door control unit is controlled automatically or manually. The connecting point of the outdoor air 0(%) setting switch 66a with the resistor 67 is connected to one of the input terminals of NAND circuit 68, the output from NAND circuit 68 is connected to the transistor 70 through the invertor circuit 69, the output from the transistor 70 is connected to a switch 71a which is turned off in response to operation of said actuator 16 for controlling the outdoor air/inner air change-over door 15 and which controls the actuator 16, the switch 71a being turned off when the change-over door 15 is operated so as to ventilate air by 0(%). The switch 66b for 30(%) ventilation is connected at is connecting point with the resistor 72, to one of the input terminals of NAND circuit 73. The output from NAND circuit 73 is connected to one of the input terminals of NAND circuit 74, the output from NAND circuit 74 is connected to the transistor 75, the output from the transistor 75 is connected to the actuator 16 via switch 71b which is turned off when the feeding rate of ventilating air is set to 30(%). The switch 66c for setting at 100(%) surrounding air is connected, at its connecting point with the resistor 76, to one of the input terminals of NAND circuit 77, the output from NAND circuit 77 is connected to one of the input terminals of NAND circuit 78, the output from NAND circuit 78 is connected to a base of the transistor 79, and the output from the transistor 79 is connected to the actuator 16 through switch 71c. Thus, switch 71c is turned off when the ventilating air is fed at 100(%). To the other input terminals of each of NAND circuits 68, 73 and 77 are connected the outputs of the switches $24_1$ and $24_2$ via inverter circuit 80. To the other input terminal of NAND circuit 74 is connected the output of NAND circuit 52, and to the other input terminal of NAND circuit 78 is connected the output from NAND circuit 81.

82 shows a ventilating air sensor which has, at its connecting point with the resistor 83, a connection to the inverting input of a comparator calculation amplifier 84. To the non-inverting input of the calculation amplifier 84 is fed a reference voltage $V_o$ corresponding to a temperature $(t_1)$. The output from the calculation amplifier is connected to the other input terminal of said NAND circuit 52 and at the same time connected to the other input terminal of NAND circuit 81 via inverter circuit 85.

The outputs from the switches $24_1$ and $24_2$ are connected to one of the input terminals of NAND circuit 86. To the other input terminal of NAND circuit 86 is connected the output from said inverter circuit 85, the output from NAND circuit 86 is connected to one of the input terminals of NOR circuit 87 and the output from NOR circuit 87 is connected to a base of the transistor 89 to control the relay 88. Contact point 88a in the relay 88 is connected to blower fan 12 via low resistor 90 (which can have any resistance including 0Ω). The output from NAND circuit 78 is connected to a base of the transistor 92 via capacitor 91, the output from the transistor 92 is connected to one of the input terminals of NAND circuit 93. To the other input terminal of NAND circuit 93 is connected the output from NAND circuit 78, and the output from NAND circuit 93 is connected to the other input terminal of NOR circuit 87.

To blower fan 12 is applied a power supply via resistors 94, 95 and 96, respectively, and controlling of the blower switch 97 can cause either a short circuited or connected condition of resistors 94, 95 and 96 and further permit controlling of the speed of rotation of the blower fan 12.

With the arrangement above, when frost occurs and either one of or both of the demist switch 24, and the rear heater winding control switch $24_2$ is/are turned on, the display lamp 51 lights and at the same time a signal of H-level is transmitted to one of the input terminals of NAND circuit 52. When the surrounding air temperature $t_a$ sensed by the sensor 82 is higher than a predetermined temperature $t_1$, the output from the calculation amplifier 84 becomes H-level, the output from NAND circuit 52 becomes L-level, the output from the invertor circuit 58 becomes H-level to turn on the transistor 61, resulting in that the contact point 62a in the relay 62 is turned on, the solenoid clutch 4 is energized and the compressor is set to the operation mode. Since a signal of L-level appears at one of the input terminals of NAND circuit 74, the output from NAND circuit 74 becomes H-level without having any relation with the other input of NAND circuit 74, the transistor 75 is turned on to feed ventilating air at 30(%). In turn, the output of H-level is fed to a base of the transistor 56 via capacitor 55 on the basis of the fact that the outputs from the switches $24_1$ and $24_2$ become H-level, resulting in that the contact point 57a of the relay 57 is turned on and after a lapse of a specified period of time causes the capacitor 55 to be charged. Further, the voltage at the base terminal of the transistor 56 becomes L-level, resulting in that the contact point 57a is turned off and the input to the rear window heater wire 50 is automatically turned off.

When the surrounding air temperature $t_a$ is lower than the predetermined temperature $t_1$, the output from the calculation amplifier 84 becomes L-level and the output from NAND circuit 52 becomes H-level, so that the compressor may not set to an on-mode. However, in this case, since the output from the inverter circuit 85 becomes H-level and this H-level is fed to both input terminals of NAND circuit 81, the output from NAND circuit 81 becomes L-level and an input of L-level is fed to one of the input terminals of NAND circuit 78, thereby the output from NAND circuit 78 becomes H-level, the transistor 79 is turned on and a full volume of 100(%) of the surrounding air is fed. When the output from NAND circuit 78 becomes H-level, the transistor 92 is turned on via capacitor 91, a signal of L-level is fed to one of the input terminals of NAND circuit 93 in response to the turned-on condition of the transistor 92, a signal of H-level as an output from NAND circuit 78 is fed to the other input terminal, the output from NAND circuit 93 becomes H-level, the signal of H-level is fed to one of the input terminals of NOR circuit 87, the signal of L-level as an output from NAND circuit 86 is fed to the other input terminal, resulting in that the output from NOR circuit 87 becomes L-level, the transistor 89 is turned off, the contact point 88a is turned off, thereby a power supply may not be fed to the blower fan 12 through the low resistor 90. Output from NAND circuit 78 becomes H-level and after a lapse of time t (sec) after feeding of a full volume of 100% of ventilating air causes the capacitor 91 to be charged, the base voltage of the transistor 92 becomes L-level, so that the transistor 92 is turned off, the output from NAND circuit 93 becomes L-level, the output from NOR circuit 87 becomes H-level. Thereby, the contact point 88a is turned on to connect blower fan 12 to a power supply and the volume of air from the blower fan is increased.

What is claimed is:

1. In combination in a vehicle air conditioning system including a rear window heater connected to a power source through a rear window heater control switch;

an evaporator at an upstream portion of said system, a compressor and a condenser coupled with said evaporator;

a heater core at a downstream portion of said system;

conduit means bringing air to said evaporator for cooling thereof and to said heater core for heating thereof;

an air mixing door upstream of said heater core for varying the amount of cold and warm air to said heater core;

a changeover door and a blower fan in said system for selectively aspirating outdoor or indoor air from ports communicating with the inside or outside of said vehicle and feeding said air to said evaporator in response to the position of said door;

a defrosting device including a control circuit for controlling said compressor, said changeover door and said blower, said control circuit including an allowable operating temperature sensor, comprising:

a comparator discriminator circuit for comparing the outdoor air temperature with a predetermined operating temperature sensed by said allowable operating temperature sensor, and transmitting a first signal when the outdoor air temperature is higher than said operating temperature and transmitting a second signal when the outdoor air temperature is lower than said operating temperature;

a timer circuit;

said control circuit including:

a first sensor circuit for sensing an operating signal for said rear window heater control switch and for sensing the first signal transmitted for said comparative discriminator circuit; and a second sensor circuit for transmitting a driving signal to said compressor driving means in response to the output from said first sensor circuit so as to operating said compressor and sensing both an operating signal for the rear window heater control switch and a second signal transmitted from said comparator discriminator circuit;

said second sensor circuit controlling the opening of said changeover door in response to the output from said second sensor circuit so as to either increase a feeding rate of outdoor air or increase the feeding volume of outdoor air by means of said blower fan, said timer circuit being operated to sense an operating signal of said rear window heater control switch, to deenergize said power supply for said rear window heater after a specified period of time upon sensing said operating signal; and said allowable operating temperature sensor being operable to transmit a signal to said control means for said door when said compressor is operated.

2. The device as set forth in claim 1, further including a manual demist switch connected to said heater control switch;

a frost sensing means operatively connected to said heater switch to turn said switch on upon sensing frost; and a safety switch for turning off said compressor when the outdoor temperature falls below a given temperature.

3. A device as set forth in claim 1, wherein there is provided a timer for use in increasing volume of air of a blower fan after a specified period of time of ventilation.

4. A device as set forth in claim 1, further including a manual demist switch connected to said heater control switch.

5. A device as set forth in claim 1, further including frost sensing means operatively connected to said heater switch to turn said switch on upon sensing frost.

6. The device of claim 1, further including a safety switch for turning off said compressor when the outdoor temperature falls below a given temperature.

7. The device of claim 1, wherein said rear window heater is operatively connected to said control circuit.

8. A device as set forth in claim 3, further including a manual demist switch connected to said heater control switch.

9. A device as set forth in claim 8, further including frost sensing means operatively connected to said heater switch to turn said switch on upon sensing frost.

10. A device of claim 9, further including a safety switch for turning off said compressor when the outdoor temperature falls below a given temperature.

11. The device of claim 16, wherein said rear window heater is operatively connected to said control circuit.

12. A device as set forth in claim 6, further including frost sensing means operatively connected to said heater switch to turn said switch on upon sensing frost.

13. The device of claim 18, further including a safety switch for turning off said compressor when the outdoor temperature falls below a given temperature.

14. The device of claim 13, wherein said rear window heater is operatively connected to said control circuit.

* * * * *